US010064445B2

(12) United States Patent
Urtaza Guerra

(10) Patent No.: US 10,064,445 B2
(45) Date of Patent: Sep. 4, 2018

(54) PLASTIC FOOTWEAR WITH INNER LINER AND OUTER LINER OF WOVEN OR NON WOVEN FABRIC

(71) Applicant: Juan Antonio Urtaza Guerra, Guanajuato (MX)

(72) Inventor: Juan Antonio Urtaza Guerra, Guanajuato (MX)

( * ) Notice: Subject to any disclaimer, the term of this patent is extended or adjusted under 35 U.S.C. 154(b) by 44 days.

(21) Appl. No.: 15/341,030

(22) Filed: Nov. 2, 2016

(65) Prior Publication Data

US 2017/0311673 A1  Nov. 2, 2017

(30) Foreign Application Priority Data

Apr. 29, 2016 (MX) .................... MX/a/2016/005649

(51) Int. Cl.
| | |
|---|---|
| *A43B 1/14* | (2006.01) |
| *A43B 3/02* | (2006.01) |
| *A43B 7/34* | (2006.01) |
| *A43B 23/02* | (2006.01) |
| *A43B 7/12* | (2006.01) |
| *B29D 35/14* | (2010.01) |
| *B29D 35/04* | (2010.01) |
| *B29K 27/06* | (2006.01) |

(52) U.S. Cl.
CPC .................. *A43B 1/14* (2013.01); *A43B 3/02* (2013.01); *A43B 7/12* (2013.01); *A43B 7/34* (2013.01); *A43B 23/024* (2013.01); *A43B 23/026* (2013.01); *A43B 23/0235* (2013.01); *B29D 35/04* (2013.01); *B29D 35/14* (2013.01); *B29K 2027/06* (2013.01); *B29K 2713/00* (2013.01)

(58) Field of Classification Search
CPC .... A43B 1/14; A43B 3/02; A43B 7/12; A43B 7/34; A43B 23/0235; A43B 23/024; A43B 23/026; B29D 35/04; B29D 35/14; B29D 35/18; B29D 35/146
See application file for complete search history.

(56) References Cited

U.S. PATENT DOCUMENTS

| | | | | |
|---|---|---|---|---|
| 2,411,479 A | * | 11/1946 | Tarlow ................... | A43B 13/28 12/142 N |
| 3,521,385 A | * | 7/1970 | Dalebout ............. | A43B 5/0454 36/117.6 |
| 3,750,310 A | * | 8/1973 | Messner ............... | A43B 3/0047 36/117.6 |
| 3,786,580 A | * | 1/1974 | Dalebout ............. | A43B 5/0405 12/142 P |
| 3,896,202 A | * | 7/1975 | Palau ................... | A43B 5/0405 264/154 |
| 4,651,444 A | * | 3/1987 | Ours .................... | A43B 1/0027 12/142 T |
| 5,740,620 A | * | 4/1998 | Giese ...................... | A43B 5/04 36/115 |

(Continued)

*Primary Examiner* — Ted Kavanaugh
(74) *Attorney, Agent, or Firm* — Hoglund & Pamias, PSC; Roberto J. Rios

(57) ABSTRACT

A pressure injected plastic footwear is provided characterized in that comprising double liner made of fabric, one on the inside part and one on the outside part; both liners may be identical or different and provide the footwear with special characteristics such as being fire retardant, antifungal, anti-mold and hermetic to moisture and liquid water as well as thermal insulating.

4 Claims, 4 Drawing Sheets

(56) References Cited

U.S. PATENT DOCUMENTS

| | | | | |
|---|---|---|---|---|
| 5,890,248 A | * | 4/1999 | Gee | A43B 9/16 |
| | | | | 12/146 B |
| 6,782,640 B2 | * | 8/2004 | Westin | A43B 13/187 |
| | | | | 36/153 |
| 2005/0150132 A1 | * | 7/2005 | Iannacone | A43B 3/105 |
| | | | | 36/11.5 |

* cited by examiner

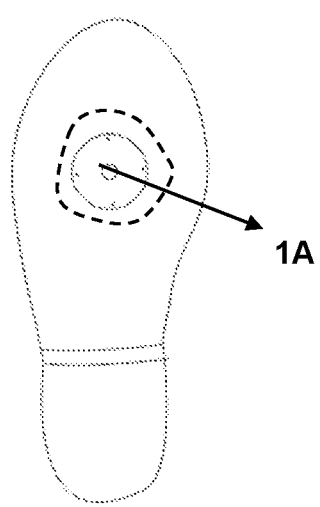
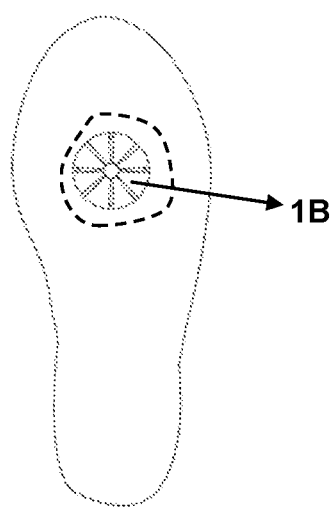
FIG. 4         FIG. 5
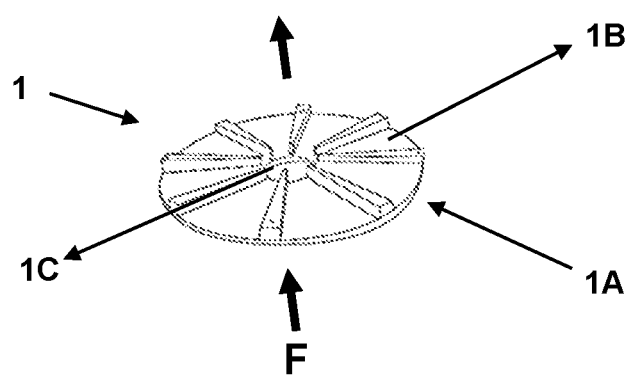
FIG. 6

PLASTIC FOOTWEAR WITH INNER LINER AND OUTER LINER OF WOVEN OR NON WOVEN FABRIC

FIELD OF THE INVENTION

The present invention refers to a footwear made of polymers such as PVC (Polyvinyl chloride $(C_2H_3Cl)_n$), which comes from the polymerization of the monomer of vinyl chloride of the flexible type, which is dustproof and waterproof, this footwear comprises an inner liner made of woven or nonwoven fabric and an outer liner made of the same or different material to that of the inner liner.

BACKGROUND OF THE INVENTION

For many years the footwear made of plastics and the footwear made of polymers with inner liner made of woven or nonwoven fabric is known, for example the patent, GB1423217 granted to KOHKOKU CHEMICAL IND CO, discloses a boot molded by injection including a sock (3) made of an elastic fabric coated with synthetic resin and having a pattern or color printed on the synthetic resin layer and an outer layer molded by injection (7) that completely covers the sock. The layer (7) is made of a transparent or translucent synthetic resin. Preferably the sock (3) is cut from a sheet material and consists of a woven fabric of elastic fibers, which have been coated with foamed polyvinyl chloride and have a printed pattern on the PVC coating.

It is also known the document EP2875941 A1, of Ferreira Alves, which discloses that the inner liner is an inseparable part of the footwear wherein the internal liner is a woven and laminated tubular sock with a polyurethane film. The sock is placed on the core or inner mold of the footwear. Due to the fact that the sock material is covered with polyurethane it is that the polymeric material (polyurethane foam), with which is preferably made the boot, does not pass the sock towards the mold core and thus, the inner liner remains only as woven fabric.

Prior to this invention, the inner liner was characterized by the cutting of two halves of the fabric and the laminated film and then they were sewn leaving only the top for its introduction into the mold core.

It is important to point out that in the case of GB'217 patent, the footwear comprises an upper part and a lower part which are joined by sewing or gluing, which is not the case of the EP' 941 patent which is casted so that the sole and the footwear body forms a single piece.

The U.S. Pat. No. 3,823,493, refers to a boot with an inner liner made of fabric which is coated with an impermeable plastic film such as PVC, see FIG. 8 of this document.

Finally, the document GB369041, refers to a method for manufacturing rubber footwear comprising a coating made of a single piece of woven with areas having different stitches to give the approximate shape of a foot. The different parts of the boot are constructed by vulcanizing the woven fabric sock placed on a shoetree.

It is considered that the first two documents represent the closest state of the art.

In general, both processes are very similar and consist of liner a heart with an open tube by a first end and cast the polymeric material. Once the heart of the mold is lined this is closed and the selected polymer is casted by injection at an enough pressure to fill the cavity formed between the tube (so called sock) and the movable parts of the mold. Once the material is injected this is allowed to cool and solidify so as to adopt the shape of the mold. It is important to mention that due to the texture and material of the sock, the polymeric material does not reach the heart of the mold and therefore, the inner liner of the footwear is a fully formed face of the selected fabric.

The outside of the footwear is the same polymeric material which while technically results in a waterproof material that prevents the passage of liquid into the footwear, the appearance is not aesthetic but the polymer used is the most attractive color.

Besides the aesthetic problem, there is a drawback with this type of footwear since it is not possible to impart them properties such as antifungal, fire retardant, etc.

Previously if it was desired to give a colorful appearance or a specific pattern to the outside of the boot it was necessary to use a transparent polymeric resin, as shown in GB 1,423,217.

As mentioned above, the prior art overcome the obstacle of the material permeation with which the boot is prepared by using a laminate to the sock fabric and/or modifying the composition of the casting material so that its viscosity prevents the pass thereof through the fabric while the present invention has saved this objection by using suitable fabrics which have characteristics such as cotton fabric which absorbs up to 27 times its weight in water according to the guide "Sewing and Craft Alliance". The polyester having high elasticity and high stability and consistently form; has a low amplification (the fiber appears smooth and rod-shaped usually is circular in cross-sectional areas); are extremely strong (tenacity=3.6 to 4.6 g tex 0.35 to 0.45 in tex and abrasion resistant); stretch resistant, extensible and does not easily wrinkle; the fibers are not attacked by bacteria, mold or moths; It is more resistant than any fiber to sunlight. In its chemical properties the polyester has good resistance to weak mineral acids; excellent resistance to oxidizing agents.

OBJECTS OF THE INVENTION

Is a first object of the present invention to provide a footwear comprising an inner liner made of woven or nonwoven fabric and an outer liner made of woven or nonwoven fabric.

It is a further object of the invention to provide an outer liner with the same or different fabric to that of the inner liner.

It is a further object to provide a footwear with fire retardant properties although it is basically built with polymeric material due to the outer liner made of fabric with fire retardant properties.

A further object is to provide a device denominated valve, which allows the PVC injection between the inner fabric and the outer fabric leaving the polymeric material in the middle thereof.

These and other objects evident for a person skilled in the art are achieved through the implementation of the invention described herein.

BRIEF DESCRIPTION OF THE INVENTION

By means of the use of an element (valve) for injecting the plastic material around two layers of textile material or fabric is provided with a boot with an interior and exterior coating made of fabric or textile material. This element called separation valve is constructed of plastic and allows the outermost layer of the boot is made of textile material which may be the same or different to the material of the inner layer.

The polymeric material is fed from the top at a suitable temperature according to the characteristics of the textile that will form the inner and outer liners. Once the discharge stage is concluded the valve is immersed in the footwear sole.

It should be understood as fabric all kind of woven or nonwoven material natural or synthetic that may be susceptible to be worked by injection molding.

BRIEF DESCRIPTION OF THE FIGURES

FIG. 4 is a bottom plan view of the boot showing the location of the filling valve.

FIG. 5 is a top plan view of the boot showing the location of the filling valve.

FIG. 6 is a top perspective view of the valve according to the present invention.

DETAILED DESCRIPTION OF THE INVENTION

Figure 1:
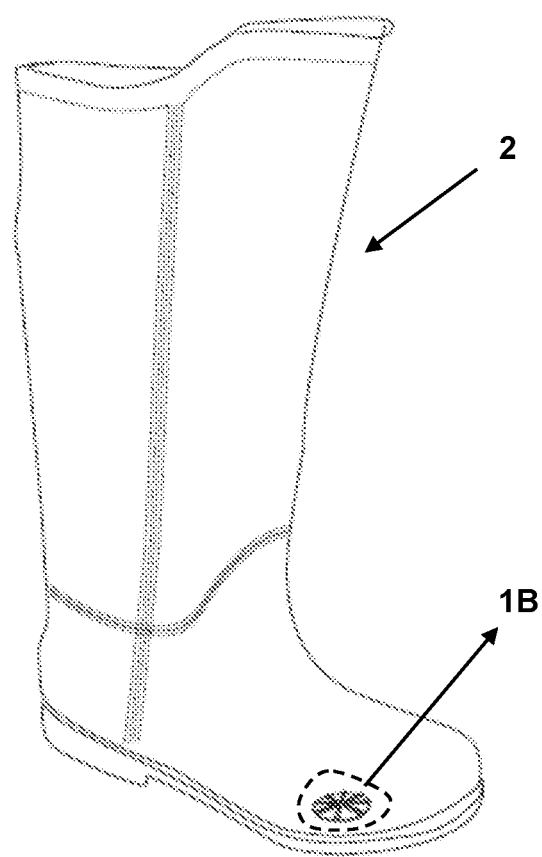
FIG. 1 is a top and front perspective view of the embodiment boot constructed according to the invention, showing the valve in its position within the footwear once manufactured.
Figure 2:
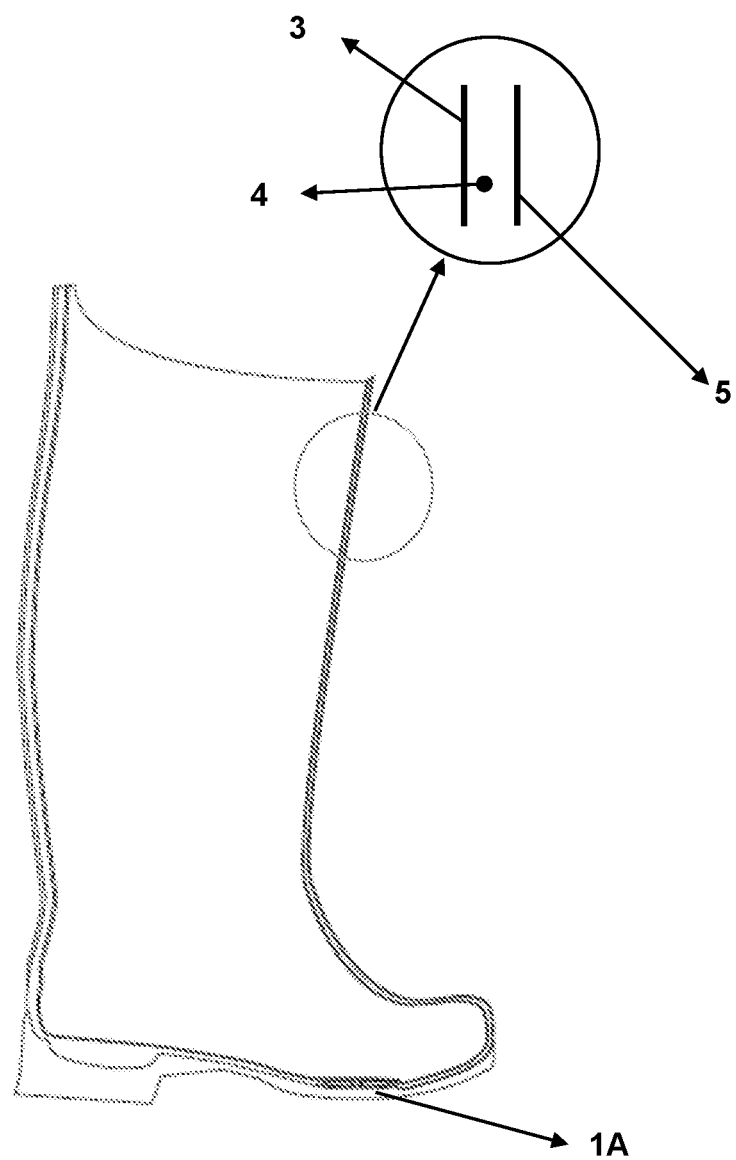
FIG. 2 is a right lateral cut view of the boot of FIG. 1 showing the layers conforming the boot constructed according to the present invention and the valve position.
Figure 3:
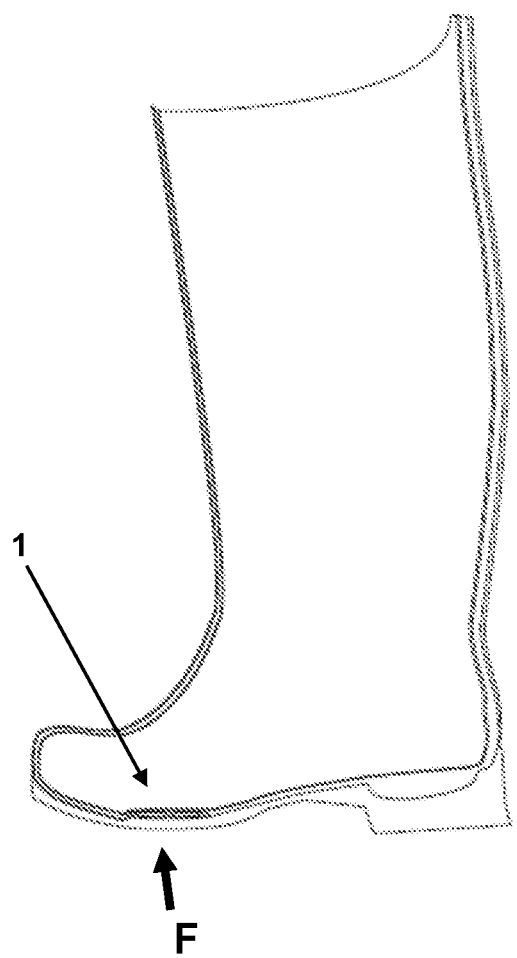
FIG. 3 is a left lateral cut view of the boot of FIG. 1 showing the layers conforming the boot constructed according to the present invention.

Referring to FIG. 1, it is shown an embodiment of the footwear including an auxiliary element or filling valve (1) for a mold (not shown) for a footwear (2) which provides the technical advantage of allowing the casting of a polymeric material (4) between two layers of textile material (fabric) (3, 5).

Once casted and solidified the polymeric material (4) a footwear (2) has been formed with an inner liner (3) of textile material and an outer liner (5) also of textile material. It should be noted that along this description it should be understood as textile material any kind of woven or non-woven textile with or without additional properties such as flame retardants, antifungal, deodorizing, anti-mold, electrically insulating and/or thermal, etc.

It should be also understood that the textile material has to support the casting conditions of the polymeric material and that the operating conditions in the described method will vary according to the properties of the desired textile material.

It should be also understood that once the footwear is formed it can be processed to impart it aesthetic or technical characteristics such as punching or incorporating metallic protection means in heels or toes.

Once obtained the mold injection with the outer finishes characteristics of (leather appearance and/or synthetic or other finishes) and inner finishes (textile liners), the footwear can be customized with accessories such as hardware, buckles, plastisols, wallets and overwallets that allow us to give the footwear a more detailed presentation generating at sight and in the use the consistency of a footwear 100% handmade with the technical advantages described herein.

Moreover, it should be considered that for the correct manufacturing of the footwear it is required the millimeter adjustment of the molds and that the guides ensure the location of the valve as well as fabrics avoiding leaks or offsets between the halves of the footwear mold.

The filling valve (1) comprises an upper part (1A) and lower part (1B). The upper part is oriented towards the origin of the filling flow while the lower part is placed facing the opposite side of the sole and comprises a set of grooves or projections so that the flow of material (F) can flow towards the space generated between the inner liner and the outer liner.

Footwear Forming Method

It should be understood that the process is a process for pressure casting of polymeric material and that the intended uses may be aesthetic or technical such as for industrial heavy duty and a combination thereof, the process is performed in a mold with a core or heart (not shown) and its divided outer mold that is joined a line of centers.

In order that the polymeric material pass from the outer face of the liner (5) to the space formed between the two liners (3) and (5), the second liner is perforated to form a hole communicating a feeding orifice (not shown) for filling the mold with a flow pass orifice (F) made of polymeric material (4) towards the first liner (3). The space between the two liners will be filled with the polymeric material and will constitute the body of the footwear.

It is important to point out that the polymeric material (4) does not penetrate the fabric or textile liner (3) remaining trapped between the liner (5) and the liner (3).

The method of preparing the footwear comprising the steps of:

a. Selecting fabric for an inner liner in accordance with the intended use;

b. Selecting fabric for an outer liner in accordance with the intended use;

c. Selecting a polymeric material based on the intended use and on the selected fabrics;

d. Selecting operating conditions in accordance with the selected polymeric material.

e. Placing a textile material (3) in the form of a sock with suitable length according to the size and shape of the footwear, in a male mold;

f. Placing and holding the filling valve with the hole (1C) of the valve coinciding with the filling orifice of the mold;

g. Placing a second sock (5) of suitable woven or non-woven fabric covering the valve and the first sock;

h. Closing the footwear mold;

i. Performing a pass of polymeric material (4) in order that said material penetrates the second sock (5) and pass through the hole (1C) of the filling valve and not penetrates the first sock (3);

j. Optionally adding accessories.

As accessories it should be understood physical elements such as metallic and/or plastic ornaments or operations such as polishing, bleached, punching, etc.

Once the process is finished the footwear comprises a single piece constituted by an inner liner (3), a polymeric filler (4), a textile outer liner (5), a valve embedded in the footwear sole, the footwear sole, a heel and a body conforming what in the field is known simply as plastic footwear.

The filling valve (1) can be provided with fastening elements to the fabric which are suitable for the effort to which the valve is submitted, for example to sharped protrusions for gripping fabrics made of plastic, metal, or a combination of both. It could be also be provided with elements helping in the positioning and fixation between the liners. Although the valve, in one embodiment, may be removed; it is preferred that said valve remains embedded and thus, the construction material of the valve not only support the working temperatures of the injection but mechanical stresses to which the footwear will be subjected in use.

The footwear obtained with the process described above may have the appearance of a footwear made of leather or similar materials. The obtained footwear has the advantages of being waterproof footwear, which protects the user, from water, mud, low temperatures, problems with fungi, etc. But it also has and comprises the advantages and features of a high fashion footwear, with desired appearance and texture, for example, leather, synthetic and/or textile.

The invention claimed is:

1. A footwear comprising;
    an inner fabric liner, an outer fabric liner and a polymeric layer filling a space between the inner liner and the outer liner,
    wherein the liners and the polymeric layer form a sock shape having an upper portion and a sole portion;
    a filling valve having a centrally located orifice and a set of projections radiating outward from the orifice;
    wherein said filling valve is located in the sole portion between the inner liner and the outer liner,
    wherein said outer fabric liner has a hole corresponding to the orifice of the valve, wherein polymeric material is introduced into the hole and the valve whereby the set of projectings direct a flow of the polymeric material to completely fill the space between the inner liner and the outer liner to form the polymeric layer.

2. The footwear according to claim 1, wherein the polymeric material which forms the polymeric layer does not penetrate the inner and outer liners, and wherein the fabrics are selected from woven and nonwoven materials.

3. A method of manufacturing the footwear according to claim 1, wherein the method comprises:
    a. selecting the fabrics for the inner liner, the outer liner, and the polymeric layer;
    b. placing the inner liner in a male mold;
    c. placing and holding the hole of the valve with a filling orifice of the mold;
    d. placing the second liner covering the valve and the inner liner;
    e. closing the mold; and
    f. directing the flow of polymeric material to pass through the hole and the orifice of the filling valve.

4. The method according to claim 3, wherein additional footwear accessories are added.

* * * * *